US008638686B2

(12) United States Patent
Shihada et al.

(10) Patent No.: US 8,638,686 B2
(45) Date of Patent: Jan. 28, 2014

(54) BUFFER SIZING FOR MULTI-HOP NETWORKS

(75) Inventors: Basem Shihada, Thuwal (SA); Kamran Jamshaid, Thuwal (SA)

(73) Assignee: King Abdullah University of Science and Technology, Thuwal (SA)

( * ) Notice: Subject to any disclaimer, the term of this patent is extended or adjusted under 35 U.S.C. 154(b) by 165 days.

(21) Appl. No.: 13/226,100

(22) Filed: Sep. 6, 2011

(65) Prior Publication Data

US 2012/0236726 A1 Sep. 20, 2012

Related U.S. Application Data

(60) Provisional application No. 61/454,536, filed on Mar. 20, 2011.

(51) Int. Cl.
H04J 1/16 (2006.01)
H04L 12/56 (2011.01)

(52) U.S. Cl.
CPC .................................. H04L 47/10 (2013.01)
USPC ........................................ 370/252; 370/237

(58) Field of Classification Search
USPC .................. 370/229–252, 338, 341
See application file for complete search history.

(56) References Cited

U.S. PATENT DOCUMENTS

| 2007/0025242 A1 | 2/2007 | Tsang | 370/229 |
| 2009/0232001 A1 | 9/2009 | Gong et al. | 370/236 |
| 2011/0182181 A1 | 7/2011 | Kang et al. | 370/231 |

FOREIGN PATENT DOCUMENTS

EP 1 283 625 2/2003

OTHER PUBLICATIONS

International Search Report and Written Opinion, issued in International Patent Application No. PCT/IB2011/002739, mailed on Apr. 13, 2012.
Appenzeller et al., "Sizing router buffers," *SIGCOMM Comput. Commun. Rev.* 34(4): 281-292, 2004.
Jamshaid et al., "Buffer sizing in 802.11 wireless mesh networks," *Proc. MASS*, pp. 272-281, 2011.
Kleinrock et al., "Packet switching in radio channels: Part I—Carrier sense multiple-access modes and their throughput-delay characteristics," *IEE Transactions on Communications*, vol. COM-23, No. 12, pp. 1400-1416, 1975.
Postel, "Transmission Control Protocol," Request for Comments (RFC) 0793, Internet Engineering Task Force, (IETF), 1981.

*Primary Examiner* — Kan Yuen
(74) *Attorney, Agent, or Firm* — Steptoe & Johnson LLP (57) ABSTRACT

A cumulative buffer may be defined for an interference domain in a wireless mesh network and distributed among nodes in the network to maintain or improve capacity utilization of network resources in the interference domain without increasing packet queuing delay times. When an interference domain having communications links sharing resources in a network is identified, a cumulative buffer size is calculated. The cumulative buffer may be distributed among buffers in each node of the interference domain according to a simple division or according to a cost function taking into account a distance of the communications link from the source and destination. The network may be monitored and the cumulative buffer size recalculated and redistributed when the network conditions change.

40 Claims, 6 Drawing Sheets

BUFFER SIZING FOR MULTI-HOP NETWORKS

CROSS-REFERENCE TO RELATED APPLICATION

This application claims priority to U.S. Provisional Patent Application No. 61/454,536 filed on Mar. 20, 2011, the entire contents of which is specifically incorporated by reference herein without disclaimer.

BACKGROUND OF THE INVENTION

1. Field of the Invention

This invention relates to networks and more particularly relates to buffering of data when routing data in networks.

2. Description of the Related Art

Wireless mesh networks (WMNs) are a type of ad hoc wireless networks that uses multi-hop wireless communications to provide or improve connectivity between mesh routers. The mesh routers may be mobile or stationary. Client devices may connect to their preferred mesh router using wired or wireless technologies. The client traffic is then routed across the mesh from mesh router to mesh router to reach another device within the mesh. Alternatively, the client traffic is routed to an external device accessible via a gateway mesh router that bridges traffic between the WMN and an external network. Client devices may roam between different mesh routers in a network, and as such, their mobility management may be performed as a part of the WMN framework.

The broadcast nature of the shared wireless channel limits the set of wireless nodes that can transmit concurrently. One differentiator between various wireless technologies is the medium access control (MAC) protocol, which controls and coordinates access to the shared wireless spectrum. Distributed wireless nodes often use a carrier sense multiple access with collision avoidance (CSMA/CA) MAC protocol. The IEEE 802.11 family of standards is a popular implementation of CSMA/CA. Wi-Fi radios supporting these standards have become a commodity that may be operated globally in license-exempt frequency bands. The IEEE 802.11 standard also supports ad hoc communication capabilities that may be used to set up WMNs. Amendments under the IEEE 802.11s standard introduce mesh capabilities for multi-hop forwarding at layer two in the network.

A buffer is a temporary storage for information bits. Packet-switched networks implement buffers to accommodate transient traffic bursts. Buffers may prevent packet loss. Buffer sizing is an important network configuration parameter: under-buffered networks lead to frequent packet loss and subsequent under-utilization of network resources, and over-buffered networks lead to increased queuing delays.

Transmission control protocol/internet protocol (TCP/IP) communications are used by a large number of network applications, such as file transfers. TCP provides reliable, in-order delivery of data. TCP uses acknowledgments (ACKs) with retransmissions to provide reliable packet delivery. A sliding window mechanism is provided in TCP for flow control and congestion control. Network capacity information may be determined by adjusting the size of its sliding window (called congestion window). TCP implements an additive increase, multiplicative decrease (AIMD) mechanism to adjust the size of its congestion window in response to network feedback. Thus, TCP operates as a closed-loop feedback system. The TCP congestion control algorithms depend on tight control loops, meaning that there are no substantial queuing delays in the network.

User datagram protocol (UDP) communications are increasingly being used by applications that value timely delivery of data over reliable delivery. These include delay-sensitive applications such as voice over IP (VoIP), gaming, and real-time video broadcast. Usually the application fills in gaps where data is either delayed, lost, or corrupted during its transmission through the network. Thus, minimizing queuing delays is an important performance metric for UDP traffic as the queuing delay contributes to the perceived quality of service (QoS) at the application layer.

A data flow or a data stream is a sequence of data packets (e.g., TCP segments or UDP packets) between two hosts. A flow in IP networks may be identified by a multi-tuple key. One conventional definition of flow uses a 5-tuple key, including source IP address, destination IP address, protocol (e.g., TCP, UDP, ICMP), source port, and destination port. A flow may traverse multiple links (with possibly heterogeneous link capacities) along the path between the source and destination. The end-to-end rate of this flow is limited by the link with the smallest available capacity along this path. That link becomes the bottleneck for this flow.

With declining memory chip prices, system architects may be inclined to over-provision routing buffers. This, however, does not necessarily lead to improved network performance. IP networks, in general, desire to minimize buffering and queuing delays. While this is apparent for real-time flows, it also holds for scenarios where throughput has precedence over delay (e.g., bulk file transfer with TCP). TCP's AIMD rate control algorithm is designed to fill any buffer and invoke an occasional packet loss so as to provide feedback to the sender. Large network buffers increase the delay before this congestion information can be communicated to the TCP source. This may have a number of ramifications: first, it may affect the stability characteristics of the TCP stream, and second, it may impact the delay characteristics for other flows (both real-time and TCP) sharing the buffer with this stream.

A conventional buffer sizing approach used in wired networks is to size the bottleneck link buffers to be greater than the bandwidth delay product (BDP) of the network, such that $B \geq C \times RTT$, where B is the bottleneck link buffer, C is the bottleneck link capacity, and RTT is the effective round-trip propagation delay through the bottleneck. BDP represents the maximum carrying capacity of the path between the source and the destination. Because queues in wired networks only build up at bottleneck links, buffer sizing is of minimal concern at other locations in the wired network.

The wireless domain introduces a number of new challenges in understanding the impact of buffer size on network performance. In a wired network, buffer sizing is usually studied by keeping the bottleneck link fully utilized. Wireless links, however, are just an abstraction for shared spectrum between communicating entities and their neighbors, only one of which can successfully transmit at a time. It is not clear how buffers may be associated with a distributed set of nodes, some of which relay traffic for other nodes in the network. Furthermore, the capacity of this shared spectrum is not a known constant, but varies over time due to sporadic noise and interference from other wireless nodes. Finally, for the popular CSMA/CA networks, the packet inter-service time at each transmission hop varies due to the random scheduling by the MAC. This MAC behavior should be accounted for when designing buffer sizing protocols for wireless networks.

SUMMARY OF THE INVENTION

A method is presented. In one embodiment, the method includes identifying a set of bottleneck nodes in a wireless mesh network. The method also includes calculating a cumulative buffer size for the set of bottleneck nodes. The method further includes distributing this cumulative buffer size between the set of bottleneck nodes.

A computer program product is presented. In one embodiment, the computer program product includes a non-transitory computer readable medium having code to identifying a set of bottleneck nodes in a wireless mesh network. The medium also includes code to calculate a cumulative buffer size. The medium further includes code to distribute the cumulative buffer size between the set of bottleneck nodes.

A system is presented. In one embodiment, the system includes a plurality of nodes in a wireless mesh network, each of the plurality of nodes having a buffer and a processor. The system also includes a plurality of communications links coupling the plurality of nodes, each communications link coupling two of the plurality of nodes, in which at least two of the plurality of communications links share resources. The system further includes an interference domain comprising at least two of the plurality of communications links that share resources, the interference domain having a cumulative buffer defined. The processor of at least one of the plurality of nodes is configured to calculate a size for the cumulative buffer. The processor is also configured to distribute the cumulative buffer size between the plurality of nodes corresponding to at least two communications links in the interference domain.

The term "coupled" is defined as connected, although not necessarily directly, and not necessarily mechanically.

The terms "a" and "an" are defined as one or more unless this disclosure explicitly requires otherwise.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

Other features and associated advantages will become apparent with reference to the following detailed description of specific embodiments in connection with the accompanying drawings.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

Various features and advantageous details are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

A buffer sizing mechanism may improve the throughput of a network data stream and minimize the queuing delay. In contrast with wired networks, which are concerned with sizing the buffer along the bottleneck link, a buffer sizing mechanism for wireless mesh networks may size a "cumulative" buffer for a set of bottleneck nodes that limit the end-to-end rate of a multi-hop flow. The bottleneck nodes may be a set of nodes sharing a common spectrum, such that the common spectrum limits the end-to-end data rate. A packet transmission by any of the bottleneck nodes may fully utilize the bottleneck spectral resource for the duration of this transmission.

Buffering just enough packets to keep the bottleneck spectrum fully utilized allows operation of the flow at high end-to-end data rates and minimization of queuing delay along links in the wireless mesh network. The collective buffer of the neighboring nodes sharing the bottleneck spectrum is referred to as the cumulative buffer. According to one embodiment, a cumulative buffer size may be set to the bandwidth delay product (BDP) of a path to the destination through the bottleneck nodes. To account for sporadic interference in wireless channel and random scheduling of carrier sense multiple access with collision avoidance (CSMA/CA) MAC, one embodiment of this invention may simply compute and implement an upper bound on BDP. Once the cumulative buffer size is determined, the buffer may be distributed among the set of nodes constituting the bottleneck. This allocation may be accomplished in multiple ways including, for example, equal distribution amongst the nodes. In another example, the buffer may be distributed through the use of a cost function that decreases the probability of packet drop based on the number of hops already traversed by the packet. Such a technique assigns a higher cost for dropping packets that have consumed a larger portion of network resources.

While the disclosed examples in this invention describe bursty and real-time traffic sent over wireless mesh networks (WMNs), such as ad hoc 802.11 networks, the embodiments described may be applied to other multi-hop wireless network technologies, including other CSMA/CA radio platforms and technologies.

Figure 1:
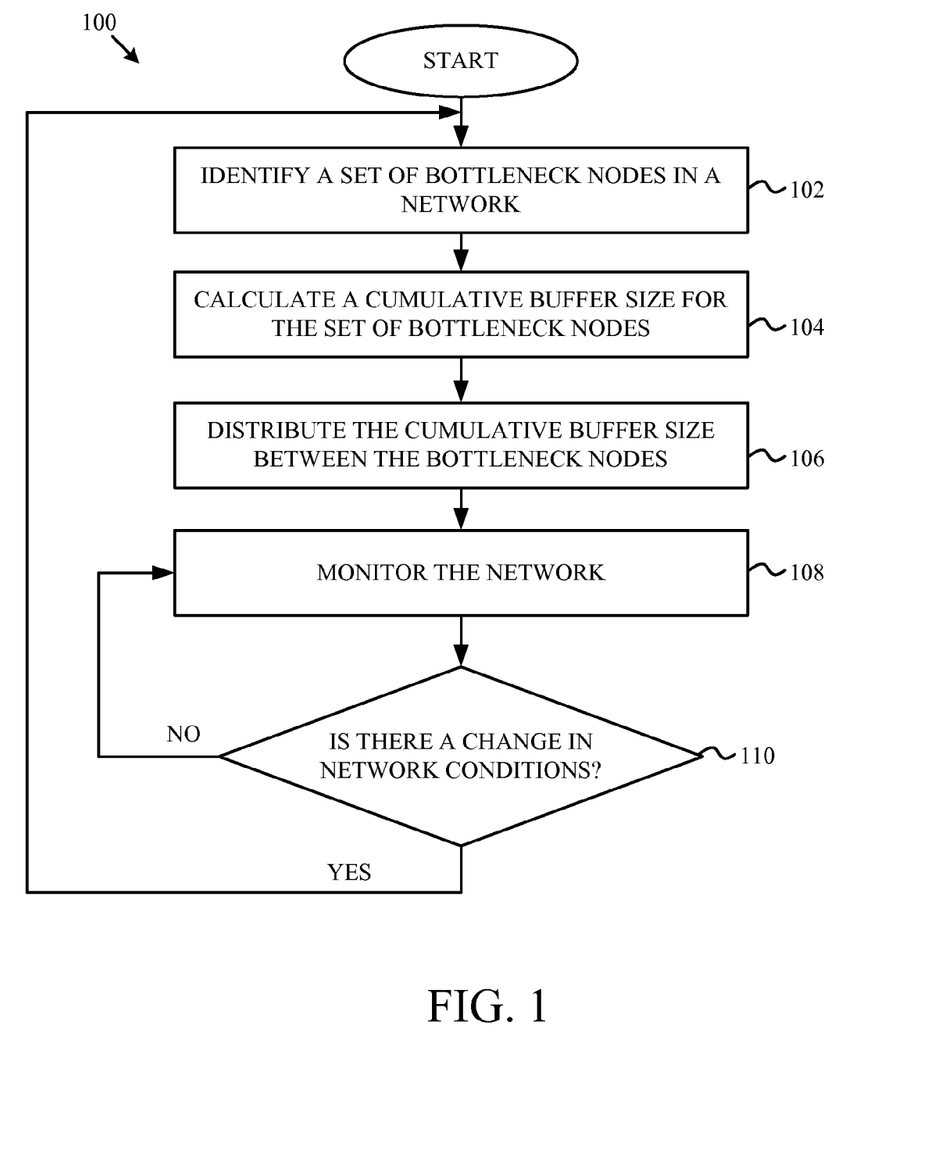
FIG. 1 is a flow chart illustrating a method of assigning a cumulative buffer according to one embodiment of the disclosure.

A method 100 for assigning buffer sizes to nodes of a wireless mesh network is illustrated in FIG. 1. The method 100 begins at block 102 with identifying a set of bottleneck nodes in a wireless mesh network. Wireless medium is a shared resource, which limits the set of wireless links that can be used concurrently. According to one embodiment, limiting links may be identified by determining an interference domain. The interference domain of a link $l_i$ may be defined as a set of all links that contend with link $l_i$.

Interference maps illustrating these relationships between various wireless links may be generated using passive or active measurement techniques. Passive measurements may be used when the network is under high load. Active measurement techniques may be used when the network is under low load. Active measurements may include an exchange of probe packets between test nodes. Interfering links exhibit a drop in their respective packet reception rates under concurrent transmissions. According to one embodiment, a two-hop interference model may be used to model a network and identify interfering links. Two links may interfere if they operate on the same channel and one endpoint of one link is within the transmission range of one endpoint of the other link. The two-hop model may approximate interference avoidance in a 802.11 network with request to send/clear to send (RTS/CTS) enabled.

Figure 2:
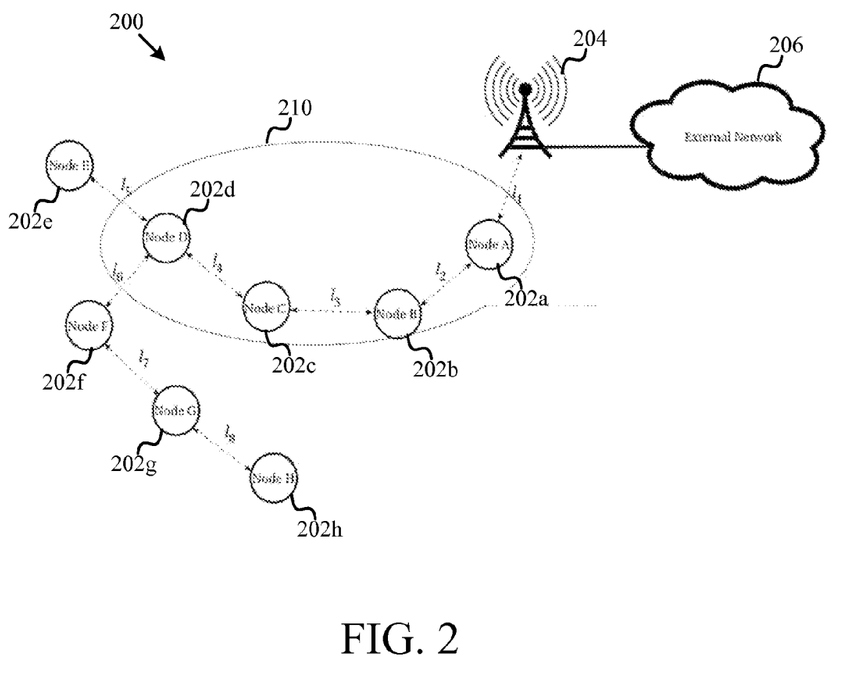
FIG. 2 is an illustration of an interference domain according to one embodiment of the disclosure.

FIG. 2 is an illustration of an interference domain according to one embodiment of the disclosure. A network 200 includes nodes 202a-h. The network 200 is coupled to an external network 206 through a gateway 204. A link $l_1$ couples the gateway 204 to the node 202a. A link $l_2$ couples the node 202a to the node 202b. A link $l_3$ couples the node 202b to the node 202c. A link $l_4$ couples the node 202c to the node 202d. A link $l_5$ couples the node 202d to the node 202e. A link $l_6$ couples the node 202e to the node 202f. A link $l_7$ couples the node 202f to the node 202g. A link $l_8$ couples the node 202g to the node 202h. An interference domain 210 of the link $l_3$ includes links $l_1, l_2, l_4, l_5,$ and $l_6$. The interference domain 210 represents links that share wireless spectrum and are located such that a transmission on one link interferes with a transmission of another link. For example, in the interference domain 210, a transmission on link l2 by the node 202a to the node 202b operates on the same spectrum as transmission on link l4 between the node 202c and the node 202d. Additionally, the transmission intended only for link l2 is within detection limits by the nodes 202d and 202c, such that transmission on the link l2 interferes with transmission on the link l4.

A utilization of the interference domain 210 may be the sum total of transmission times for all the links $l_1$-$l_6$ in the interference domain 210. The sum may be represented mathematically as described below according to one embodiment of the disclosure. If R(m,n) is the link rate between neighboring nodes (m,n) and r(m,n) is the traffic carried by this link between neighboring nodes (m,n), and $r_i$ is the end-to-end rate for flow f, then $$r_{(m,n)} = \sum_{i:f_i \text{ traverses}(m,n)} r_i.$$

If I={$I_1, I_2, \ldots I_j$} is the set of j interference domains in the network 200 and physical and MAC layer headers are ignored, then $$\sum_{\forall (m,n) \text{ in } I_p} \frac{r_{(m,n)}}{R_{(m,n)}} \leq 1, \forall p \in \{1, 2, \ldots, j\}.$$

i.e., the utilization of an interference domain (defined as the sum total of transmission times of constituent links) cannot exceed 1 for all interference domains in the network.

The interference domain 210 may become saturated when the spectrum is fully utilized. A saturated interference domain may be a bottleneck for a data flow if that data flow has a maximal rate among all other flows using the saturated interference domain. A multi-hop data flow may be part of one or more interference domains. The data flow's end-to-end rate may then be bound by the interference domain that assigns it the lowest rate.

Referring back to FIG. 1, at block 104 a cumulative buffer size is calculated. A cumulative buffer may be configured to fully utilize the spectral resource in the bottleneck interference domain to reduce constraints on the end-to-end rate of a multi-hop data stream. According to one embodiment, spectral resource utilization may be improved when the nodes 202a-f in the bottleneck interference domain 210 always have packets to send. A packet transmission by any one of the nodes 202a-f may fully utilize the available spectral resource shared by the nodes 202a-f in the interference domain 210 for the duration of the transmission. Thus, each node may be considered when assigning a buffer size to each of the nodes 202a-f.

Figure 3:
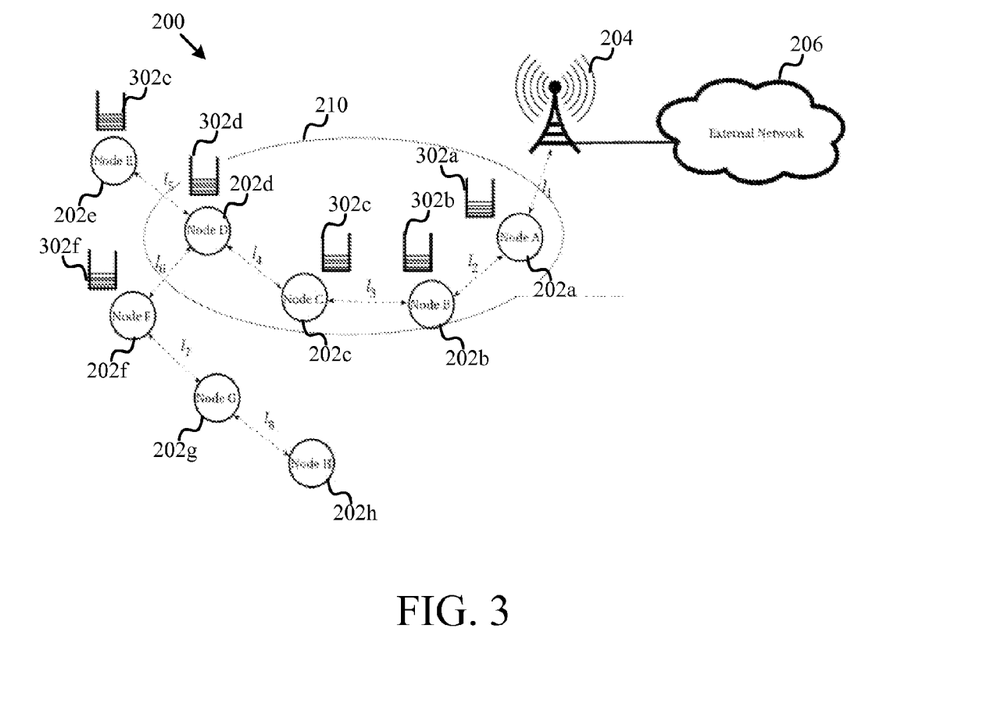
FIG. 3 is a block diagram illustrating a wireless mesh network with a cumulative buffer set for nodes in an interference domain according to one embodiment of the disclosure.

This cumulative buffer size may be the sum of the buffer space at all the constituent nodes. The cumulative buffer utilization may be the aggregate backlog at the constituent nodes. The cumulative buffer packet arrival rate may be the sum of the arrival rates at individual nodes. FIG. 3 is a block diagram illustrating a wireless mesh network with a cumulative buffer set for nodes in an interference domain according to one embodiment of the disclosure. However, this cumulative buffer does not exhibit the first in, first out (FIFO) characteristics due to distributed queues and stochastic CSMA/CA scheduling. A cumulative buffer may be distributed in the buffers 303a-303f of the nodes 202a-f in the bottleneck interference domain 210.

According to one embodiment, the utilization of bottleneck spectrum may be enhanced by setting the bottleneck cumulative buffer arbitrarily large such that it will always have sufficient packets in queue to saturate the bottleneck, even when the traffic source is stalled trying to recover from signs of network congestion (e.g., a packet loss). However, if this buffer is larger than a rate supported by the network, the buffer may increase queuing delay without increasing the end-to-end flow rate. If the bottleneck is under-buffered, its spectral resource may not always be fully utilized.

A multi-hop wireless data stream may be transmitted over a network having a maximum rate of λ packets/seconds. The one-way propagation delay through the bottleneck interference domain may be d seconds. In an uncongested network, propagation delay may be dominated by transmission delays (with little or no queuing delays) along the multi-hop wireless links. The round-trip time (RTT) through the bottleneck may be RTT=2d.

According to one embodiment, the mesh network may have real-time traffic streams transmitted across links of the network. When the mean arrival rate for the real-time traffic stream is μ packets/second at the bottleneck interference domain and a given source-destination pair, this bottleneck may support traffic at a maximum rate of λ packets/second. The bottleneck interference domain cumulative buffer size may be computed as B≥λd. Those skilled in the art will realize that our description uses packets instead of bits or bytes simply for ease of exposition.

When $\mu \geq \lambda$, the buffer size B may reduce queuing delays by dropping excess traffic before the traffic consumes the spectral resource of the interference domain. Over a time period, these packet drops may invoke a higher layer decision at the source node to reduce rate. For example, a VoIP client may switch from a high bit-rate codec to a low bit-rate codec to adapt to network settings.

When $\mu \leq \lambda$, a cumulative buffer computed from B≥λd may be implemented in the interference domain to improve utilization of capacity in the interference domain when the network implements a random scheduling protocol such as CSMA/CA.

According to another embodiment, the mesh network may have bursty traffic streams, such as backlogged TCP streams, transmitted across links of the network. Assuming the stream is in an AIMD congestion avoidance phase, the TCP window size may reach a value of $W_{max}$ packets before experiencing a loss. Thus, the sender may halve the window size to $W_{max}/2$ packets. Since the window size limits the number of unacknowledged packets in transit, the sender, on average, waits for a time interval $$\frac{w_{max}/2}{\lambda}$$

before starting to retransmit. During this time, the distributed buffer B takes B/λ seconds to drain. The source may start retransmitting before the buffer is fully drained to increase utilization of the bottleneck spectrum such that $$\frac{w_{max}/2}{\lambda} \langle B/\lambda \text{ or } B \rangle \frac{w_{max}}{2}.$$

When the TCP source starts retransmitting, the source rate may be equal to or higher than λ to provide for full utilization of the bottleneck capacity. Thus $$\frac{w_{max}/2}{RTT} \geq \lambda, \text{ or}, \frac{w_{max}}{2} \geq \lambda \times RTT.$$

Thus, B≥λ×RTT.

In multi-hop wireless networks, λ may be limited by the bottleneck interference domain. Values for λ and RTT may be based, in part, on the network topology and wireless channel characteristics. According to one embodiment, these values may be periodically measured and recorded. According to another embodiment, approximation strategies may be used to determine λ and RTT to reduce overhead in measuring and recording values. For example, upper bounds on λ and RTT may be estimated. Using an upper bound on these values may size the distributed buffer B larger than the instantaneously precise BDP. This may be beneficial to account for the time-varying capacity of the wireless channel, and non-deterministic 802.11 distributed coordination function (DCF) scheduling. The resulting larger buffer trades-off queuing delay for higher channel utilization.

Referring back to FIG. 1, at block 106 the cumulative buffer is distributed among the bottleneck nodes. Once the cumulative buffer size B is computed, the cumulative buffer may be distributed among the set of nodes 202a-f in the bottleneck collision domain 210. According to one embodiment, B may be equally divided between the nodes 202a-f. Equally dividing the buffer may be simple to implement. According to another embodiment, the cumulative buffer may be distributed between the nodes 202a-f according to a cost function. For example, one cost function may consider that a queue drop closer to the source has consumed fewer network resources than a queue drop near the destination.

Figure 4:
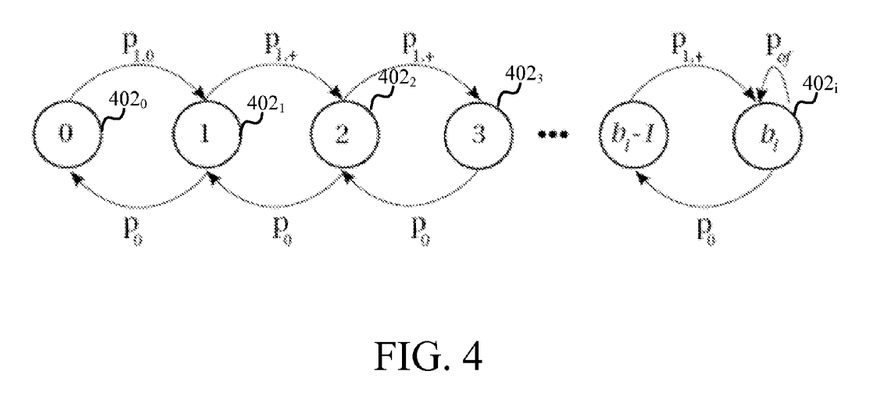
FIG. 4 is a state diagram illustrating the queue occupancy state transition for a mesh node according to one embodiment of the disclosure.

FIG. 4 is a state diagram illustrating the queue occupancy state transition for a mesh node according to one embodiment of the disclosure. A node $n_i$ may have a queue capacity of $b_i$ packets corresponding to its allocated buffer. $\pi_k$ may represent the steady state probability that the node queue size is k, for $0 \leq k \leq b_i$. In particular, $\pi_0$ and $\pi_{b_i}$ may represent the probabilities that the buffer is empty or full, respectively. A node may transmit a packet with probability $p_0$ and transition to a state with one less packet queued. With probability $p_{1,+}$, a relay node receives a packet from its parent in the routing tree, and then queues it locally for transmission to the next hop. The transition probability $p_{1,0}$ is a special case for packet reception when the current queue size is zero. Finally, probability $p_{of}$ represents a packet drop due to buffer overflow.

A node may begin at state $402_0$ with no packets buffered at the node. The node may advance to state $402_1$ with some probability $p_{1,0}$, the probability the node receives a packet for relay when the buffer is empty. The node may return to state $402_0$ with some probability $p_0$ that a successful transmission occurs. From the state $402_1$ the node may advance to $402_2$, or more generally $402_i$, with some probability $p_{1,+}$ that the node receives a packet for relay that is then queued for transmission. When the node is in state $402_i$, the node remains at state $402_i$ until a packet is successfully transmitted with some probability $p_0$. Additionally, there is some probability $p_{of}$ that the node receives a packet and remains at the state $402_i$ because the buffer is full.

The buffer at a node overflows when a node in state $402_i$ receives a packet. Thus, $p_{of} = \pi_{b_i} \times p_{1,+}$. The cost associated with this drop due to network resources already consumed by this packet may increase with the hop distance of n, from the source along the routing path. For example, a packet dropped closer to source wastes fewer network resources compared to a packet dropped closer to destination. When the nodes $n_i$ are ordered such that they represent an increasing hop distance from the source, the index i for i={1, 2, ..., M}, where M is the number of nodes in the interference domain, may be implemented as a simple cost function to represent the bias associated with a packet drop at node $n_i$.

According to one embodiment, the cumulative buffer may be distributed according to the following constraints:

$$\min_{b_i} \sum_{i=1}^{M} \pi_{b_i} \times p_{1,+} \times i,$$

$$\text{subject to } \sum_{i=1}^{M} b_i = B$$

$$\text{and } b_i \geq 0, \forall i \in M.$$

This cost function may be solved either analytically or using any of a number of software packages commonly used in solving sets of equations. In one example, the analysis may result in small buffers at individual mesh routers.

The cumulative buffer size may be distributed throughout the buffers 302a-f of the wireless mesh network 200 by providing in each node a processor configured to determine the node's buffer size. According to one embodiment, the processor in each node 202a-f may calculate the portion of the cumulative buffer size that should be assigned to the node. The node then configures its own buffer with the corresponding size. According to another embodiment, the processor of one of the nodes 202a-f in the interference domain 210 may compute buffer sizes for each of the nodes 202a-f and transmit the buffer size assignments to each of the other nodes. The processor of each of the other nodes would then configured its buffer size in accordance with instructions received over the network 200.

Referring back to FIG. 1, at block 108 the mesh network is monitored for changes. For example, monitoring the network may include detecting changes in a bottleneck capacity. The cumulative buffer size for the bottleneck and the subsequent buffer sizes for each node are based on the bottleneck interference domain characteristics, including the bottleneck capacity and delay. These characteristics may change over time. For example, a 802.11 ad hoc network may use adaptive link rates to increase or decrease wireless link capacities based on the transmit power control, channel noise, and/or interference from other network nodes. These characteristics may be monitored over time. When a change is detected, a new cumulative buffer may be computed for the bottleneck interference domain 210, which may then be used to assign buffer space to individual nodes 202a-f.

At block 110 if changes in the network are detected the method 100 returns to block 102 and repeats the blocks 102, 104, 106, 108, and 110. If no changes are detected at block 110 the method 100 returns to monitoring the network at block 108 until changes are detected.

Figure 5:
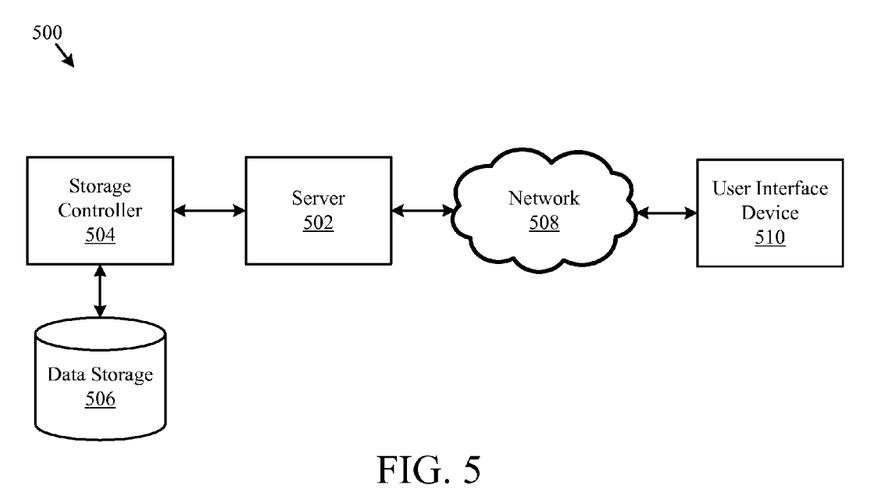
FIG. 5 is block diagram illustrating a data management system configured to store databases, tables, and/or records according to one embodiment of the disclosure.

FIG. 5 illustrates one embodiment of a system 500 for an information system incorporating a network such as the wireless mesh network described in the embodiments above. The system 500 may include a server 502, a data storage device 506, a network 508, and a user interface device 510. The server 502 may be a dedicated server or one server in a cloud computing system. In a further embodiment, the system 500 may include a storage controller 504, or storage server configured to manage data communications between the data storage device 506, and the server 502 or other components in communication with the network 508. In an alternative embodiment, the storage controller 504 may be coupled to the network 508.

In one embodiment, the user interface device 510 is referred to broadly and is intended to encompass a suitable processor-based device such as a desktop computer, a laptop computer, a personal digital assistant (PDA) or table computer, a smart phone or other a mobile communication device or organizer device having access to the network 508. In a further embodiment, the user interface device 510 may access the Internet or other wide area network (WAN) or local area network (LAN) through a wireless mesh network to access a web application or web service hosted by the server 502 and provide a user interface for enabling a user to enter or receive information.

The network 508 may facilitate communications of data between the server 502 and the user interface device 510. The network 508 may include any type of communications network including, but not limited to, a multi-hop wireless mesh network, a direct PC-to-PC connection, a local area network (LAN), a wide area network (WAN), a modem-to-modem connection, the Internet, a combination of the above, or any other communications network now known or later developed within the networking arts which permits two or more computers to communicate, one with another.

Figure 6:
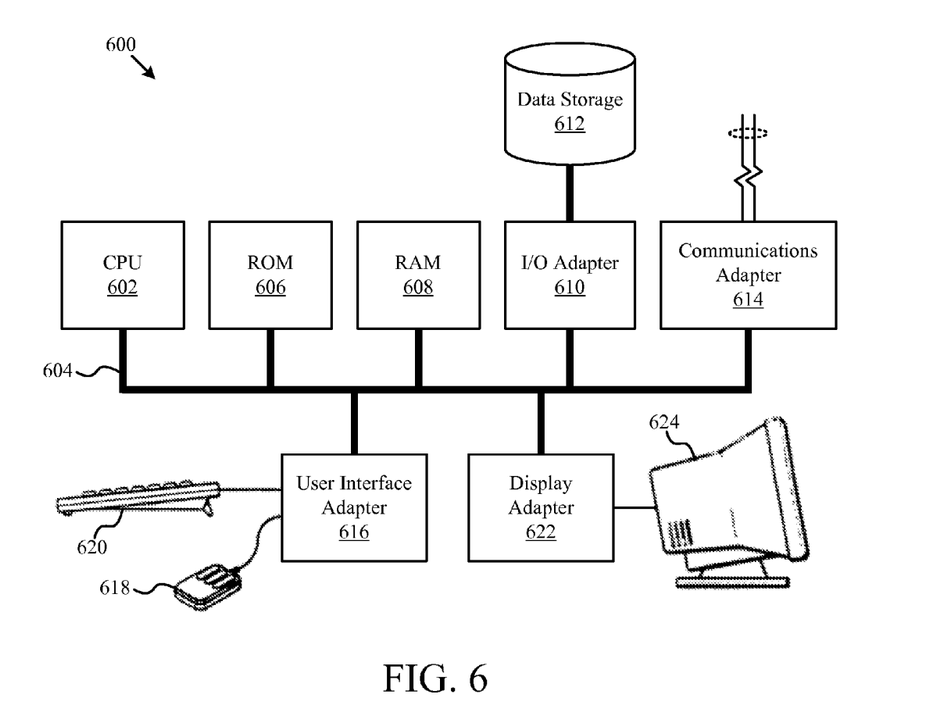
FIG. 6 is a block diagram illustrating a computer system according to one embodiment of the disclosure.

FIG. 6 illustrates a computer system 600 adapted according to certain embodiments of the server 502 and/or the user interface device 510. The central processing unit ("CPU") 602 is coupled to the system bus 604. The CPU 602 may be a general purpose CPU or microprocessor, graphics processing unit ("GPU"), and/or microcontroller. The present embodiments are not restricted by the architecture of the CPU 602 so long as the CPU 602, whether directly or indirectly, supports the modules and operations as described herein. The CPU 602 may execute the various logical instructions according to the present embodiments.

The computer system 600 also may include random access memory (RAM) 608, which may be SRAM, DRAM, SDRAM, or the like. The computer system 600 may utilize RAM 608 to store the various data structures used by a software application such as databases, tables, and/or records. The computer system 600 may also include read only memory (ROM) 606 which may be PROM, EPROM, EEPROM, optical storage, or the like. The ROM may store configuration information for booting the computer system 600. The RAM 608 and the ROM 606 hold user and system data.

The computer system 600 may also include an input/output (I/O) adapter 610, a communications adapter 614, a user interface adapter 616, and a display adapter 622. The I/O adapter 610 and/or the user interface adapter 616 may, in certain embodiments, enable a user to interact with the computer system 600. In a further embodiment, the display adapter 622 may display a graphical user interface associated with a software or web-based application on a display device 624, such as a monitor or touch screen.

The I/O adapter 610 may connect one or more storage devices 612, such as one or more of a hard drive, a compact disk (CD) drive, a floppy disk drive, and a tape drive, to the computer system 600. The communications adapter 614 may be adapted to couple the computer system 600 to the network 408, which may be one or more of a LAN, WAN, and/or the Internet. The communications adapter 614 may be adapted to couple the computer system 600 to a storage device 612. The user interface adapter 616 couples user input devices, such as a keyboard 620, a pointing device 618, and/or a touch screen (not shown) to the computer system 600. The display adapter 622 may be driven by the CPU 602 to control the display on the display device 624.

The applications of the present disclosure are not limited to the architecture of computer system 600. Rather the computer system 600 is provided as an example of one type of computing device that may be adapted to perform the functions of a server 502 and/or the user interface device 510. For example, any suitable processor-based device may be utilized including, without limitation, personal data assistants (PDAs), tablet computers, smart phones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

The schematic flow chart diagrams of FIGS. 1 and 4 are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope of the invention. In addition, modifications may be made to the disclosed apparatus and components may be eliminated or substituted for the components described herein where the same or similar results would be achieved. All such similar substitutes and modifications apparent to those skilled in the art are deemed to be within the spirit, scope, and concept of the invention as defined by the appended claims.

What is claimed is:

1. A method, comprising:
   identifying a set of bottleneck nodes in a wireless mesh network;
   calculating a cumulative buffer size for the set of bottleneck nodes; and
   distributing the cumulative buffer size between the set of bottleneck nodes;
   wherein each node includes a buffer, and the cumulative buffer size is a function of sizes of the buffers of the set of bottleneck nodes and wherein calculating the cumulative buffer size comprises selecting a cumulative buffer size larger than or equal to a product of a maximum packet rate and a one-way propagation delay, when data in the mesh network is a real-time traffic stream.

2. The method of claim 1, further comprising:
   monitoring the wireless mesh network for changes in bottleneck capacity; and
   repeating, when the bottleneck capacity changes, the identifying, calculating, and distributing steps.

3. The method of claim 2, in which the step of monitoring comprises monitoring for a change in at least one parameter selected from a group consisting of a transmit power, channel noise, interference level, and network topological changes.

4. The method of claim 1, in which the step of identifying a set of bottleneck nodes comprises identifying an interference domain corresponding to a link between two nodes of the mesh network.

5. The method of claim 4, in which the step of identifying an interference domain comprises identifying links between nodes of the mesh network that exhibit a drop in packet reception rates under concurrent transmissions.

6. The method of claim 1, in which the step of calculating the cumulative buffer size comprises selecting a cumulative buffer size larger than or equal to a product of a maximum packet rate and a round-trip time (RTT), when data in the mesh network is a bursty traffic stream.

7. The method of claim 1, in which the step of distributing the cumulative buffer size between the set of bottleneck nodes comprises calculating a buffer size for each of node in the set of bottleneck nodes based, in part, on a cost function considering a distance of each node from a source node.

8. A computer program product, comprising:
   a non-transitory computer readable medium comprising:
      code to identifying a set of bottleneck nodes in a wireless mesh network;
      code to calculate a cumulative buffer size; and
      code to distribute the cumulative buffer size between the set of bottleneck nodes;
      wherein each node includes a buffer, and the cumulative buffer size is a function of sizes of the buffers of the set of bottleneck nodes and in which the code to calculate the cumulative buffer size comprises code to select a cumulative buffer size larger than or equal to a product of a maximum packet rate and a one-way propagation delay, when data in the mesh network is a real-time traffic stream.

9. The computer program product of claim 8, in which the medium further comprises: code to monitor the wireless mesh network for changes in bottleneck capacity; and code to repeat, when the bottleneck capacity changes, the identifying, calculating, and distributing steps.

10. The computer program product of claim 9, in which the code to monitor comprises code to monitor for a change in at least one parameter selected from a group consisting of a transmit power, channel noise, interference level, and network topological changes.

11. The computer program product of claim 8, in which the code to identify a set of bottleneck nodes comprises code to identify an interference domain corresponding to a link between two nodes of the mesh network.

12. The computer program product of claim 11, in which the code to identify an interference domain comprises code to identify links between nodes of the mesh network that exhibit a drop in packet reception rates under concurrent transmissions.

13. The computer program product of claim 8, in which the code to calculate the cumulative buffer size comprises code to select a cumulative buffer size larger than or equal to a product of a maximum packet rate and a round-trip time (RTT), when data in the mesh network is a bursty traffic stream.

14. The computer program product of claim 8, in which the code to distribute the cumulative buffer size between the set of bottleneck nodes comprises code to calculate a buffer size for each of node in the set of bottleneck nodes based, in part, on a distance of each node from a source node.

15. A system, comprising:
a plurality of nodes in a wireless mesh network, each of the plurality of nodes having a buffer and a processor;
a plurality of communications links coupling the plurality of nodes, each communications link coupling two of the plurality of nodes, in which at least two of the plurality of communications links share spectrum; and
an interference domain comprising the at least two of the plurality of communications links that share resources, the interference domain having a cumulative buffer defined, in which the processor of at least one of the plurality of nodes is configured:
to calculate a size for the cumulative buffer by selecting a cumulative buffer size larger than or equal to a product of a maximum packet rate and a one-way propagation delay, when data in the mesh network is a real-time traffic stream; and
to distribute the cumulative buffer size between the plurality of nodes corresponding to the at least two communications links in the interference domain;
wherein the cumulative buffer size is a function of sizes of the buffers of the plurality of nodes.

16. The system of claim 15, in which the processor is further configured:
to monitor the wireless mesh network for changes in bottleneck capacity; and to repeat,
when the bottleneck capacity changes, the calculating and the distributing steps.

17. The system of claim 15, in which the processor is configured to distribute the cumulative buffer size according to a cost function.

18. The system of claim 15, in which the wireless mesh network is an 802.11 ad hoc network.

19. A method, comprising:
identifying a set of bottleneck nodes in a wireless mesh network;
calculating a cumulative buffer size for the set of bottleneck nodes; and
distributing the cumulative buffer size between the set of bottleneck nodes, in which the step of identifying a set of bottleneck nodes comprises identifying an interference domain corresponding to a link between two nodes of the mesh network and in which the step of identifying an interference domain comprises identifying links between nodes of the mesh network that exhibit a drop in packet reception rates under concurrent transmissions.

20. The method of claim 19, further comprising:
monitoring the wireless mesh network for changes in bottleneck capacity; and
repeating, when the bottleneck capacity changes, the identifying, calculating, and distributing steps.

21. The method of claim 20, in which the step of monitoring comprises monitoring for a change in at least one parameter selected from a group consisting of a transmit power, channel noise, interference level, and network topological changes.

22. The method of claim 19, in which the step of identifying a set of bottleneck nodes comprises identifying an interference domain corresponding to a link between two nodes of the mesh network.

23. The method of claim 19, in which the step of calculating the cumulative buffer size comprises selecting a cumulative buffer size larger than or equal to a product of a maximum packet rate and a one-way propagation delay, when data in the mesh network is a real-time traffic stream.

24. The method of claim 19, in which the step of calculating the cumulative buffer size comprises selecting a cumulative buffer size larger than or equal to a product of a maximum packet rate and a round-trip time (RTT), when data in the mesh network is a bursty traffic stream.

25. The method of claim 19, in which the step of distributing the cumulative buffer size between the set of bottleneck nodes comprises calculating a buffer size for each of node in the set of bottleneck nodes based, in part, on a cost function considering a distance of each node from a source node.

26. A method, comprising:
identifying a set of bottleneck nodes in a wireless mesh network;
calculating a cumulative buffer size for the set of bottleneck nodes; and
distributing the cumulative buffer size between the set of bottleneck nodes, in which the step of calculating the cumulative buffer size comprises selecting a cumulative buffer size larger than or equal to a product of a maximum packet rate and a one-way propagation delay, when data in the mesh network is a real-time traffic stream.

27. The method of claim 26, further comprising:
monitoring the wireless mesh network for changes in bottleneck capacity; and
repeating, when the bottleneck capacity changes, the identifying, calculating, and distributing steps.

28. The method of claim 26, in which the step of monitoring comprises monitoring for a change in at least one parameter selected from a group consisting of a transmit power, channel noise, interference level, and network topological changes.

29. The method of claim 26, in which the step of identifying a set of bottleneck nodes comprises identifying an interference domain corresponding to a link between two nodes of the mesh network.

30. The method of claim 29, in which the step of identifying an interference domain comprises identifying links between nodes of the mesh network that exhibit a drop in packet reception rates under concurrent transmissions.

31. A method, comprising:
identifying a set of bottleneck nodes in a wireless mesh network;
calculating a cumulative buffer size for the set of bottleneck nodes; and
distributing the cumulative buffer size between the set of bottleneck nodes, in which the step of calculating the cumulative buffer size comprises selecting a cumulative buffer size larger than or equal to a product of a maximum packet rate and a round-trip time (RTT), when data in the mesh network is a bursty traffic stream.

32. The method of claim 31, further comprising:
monitoring the wireless mesh network for changes in bottleneck capacity; and
repeating, when the bottleneck capacity changes, the identifying, calculating, and distributing steps.

33. The method of claim 32, in which the step of monitoring comprises monitoring for a change in at least one parameter selected from a group consisting of a transmit power, channel noise, interference level, and network topological changes.

34. The method of claim 31, in which the step of identifying a set of bottleneck nodes comprises identifying an interference domain corresponding to a link between two nodes of the mesh network.

35. The method of claim 34, in which the step of identifying an interference domain comprises identifying links between nodes of the mesh network that exhibit a drop in packet reception rates under concurrent transmissions.

36. A method, comprising:
   identifying a set of bottleneck nodes in a wireless mesh network;
   calculating a cumulative buffer size for the set of bottleneck nodes; and
   distributing the cumulative buffer size between the set of bottleneck nodes, in which the step of distributing the cumulative buffer size between the set of bottleneck nodes comprises calculating a buffer size for each of node in the set of bottleneck nodes based, in part, on a cost function considering a distance of each node from a source node.

37. The method of claim 36, further comprising:
   monitoring the wireless mesh network for changes in bottleneck capacity; and
   repeating, when the bottleneck capacity changes, the identifying, calculating, and distributing steps.

38. The method of claim 37, in which the step of monitoring comprises monitoring for a change in at least one parameter selected from a group consisting of a transmit power, channel noise, interference level, and network topological changes.

39. The method of claim 36, in which the step of identifying a set of bottleneck nodes comprises identifying an interference domain corresponding to a link between two nodes of the mesh network.

40. The method of claim 39, in which the step of identifying an interference domain comprises identifying links between nodes of the mesh network that exhibit a drop in packet reception rates under concurrent transmissions.

\* \* \* \* \*